United States Patent

Newton et al.

[11] Patent Number: 6,149,337
[45] Date of Patent: Nov. 21, 2000

[54] SELF-ALIGNING BALL AND SOCKET BEARING ASSEMBLY

[75] Inventors: John R. Newton, Jupiter; Jeffre W. Strong, Boca Raton, both of Fla.

[73] Assignee: Tides Marine, Inc., Deerfield Beach, Fla.

[21] Appl. No.: 08/856,743

[22] Filed: May 15, 1997

[51] Int. Cl.[7] .................................................. F16C 11/00
[52] U.S. Cl. .......................... 403/122; 384/146; 384/192; 114/169
[58] Field of Search .................................... 403/122, 131, 403/135; 384/146, 192; 114/169, 165

[56] References Cited

U.S. PATENT DOCUMENTS

| | | | |
|---|---|---|---|
| 1,025,884 | 5/1912 | Schmitt | 403/69 |
| 1,063,389 | 6/1913 | Robbins . | |
| 1,066,584 | 7/1913 | Cookingham et al. | 384/192 |
| 1,067,892 | 7/1913 | Walters | 403/131 X |
| 2,637,528 | 5/1953 | Cox et al. | 403/131 X |
| 2,891,826 | 6/1959 | Josephson et al. . | |
| 3,381,649 | 5/1968 | Ward . | |
| 3,588,201 | 6/1971 | Schmidt | 384/146 |
| 3,848,938 | 11/1974 | Stella et al. | 384/146 |
| 3,873,166 | 3/1975 | Berg et al. | 384/146 |
| 4,109,976 | 8/1978 | Koch | 384/192 |
| 4,251,122 | 2/1981 | McCloskey | 384/192 |
| 5,224,790 | 7/1993 | Hein | 384/192 X |
| 5,265,965 | 11/1993 | Harris et al. | 384/192 X |
| 5,346,315 | 9/1994 | Strong et al. | 384/192 |

*Primary Examiner*—Terry Lee Melius
*Assistant Examiner*—William L. Miller
*Attorney, Agent, or Firm*—Hopgood, Calimafde, Kalil & Judlowe

[57] ABSTRACT

A ball and socket bearing assembly adapted to receive the vertical post of a rudder installed in the stern of a boat. The assembly consists of a molded journal box having a spheroidal cavity therein defining a socket in which is nested a ball-like bearing formed of UHMW polyethylene or of a material having similar non-stick properties, the post passing through an axial bore in the bearing. The assembly is produced by placing the preformed bearing in a mold to create an annular space between the bearing and the inner wall of the mold. This space is then flooded with a curable liquid resin monomer whereby when the monomer is polymerized and rigidified, it does not bond to the non-stick bearing. The bearing is therefore free to rotate in the cavity and align itself with the rudder post regardless of the degree to which the post deviates from the vertical as a result of hydrodynamic or other forces imposed on the rudder.

7 Claims, 2 Drawing Sheets

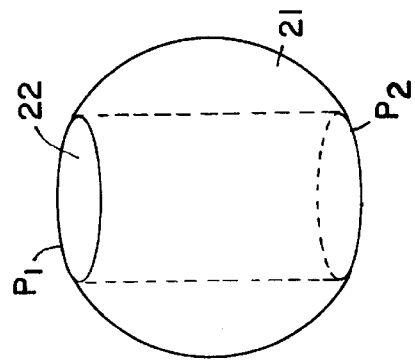
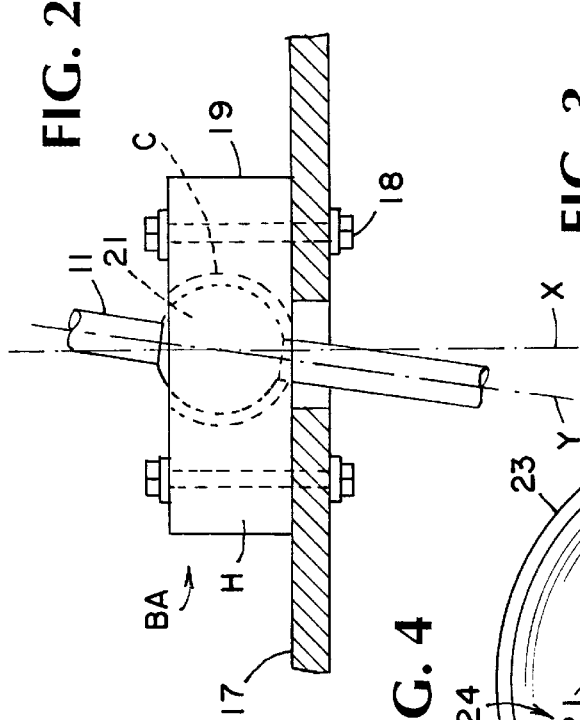
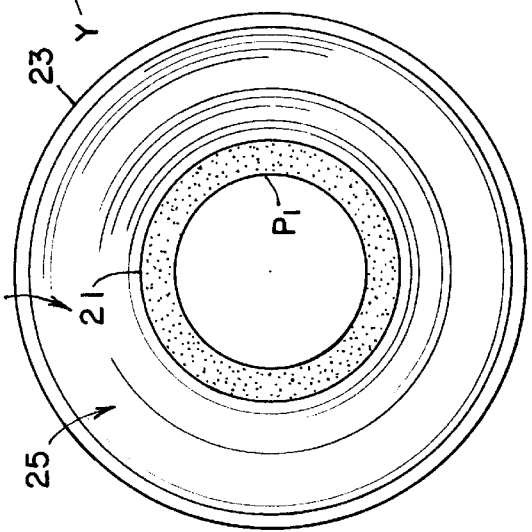
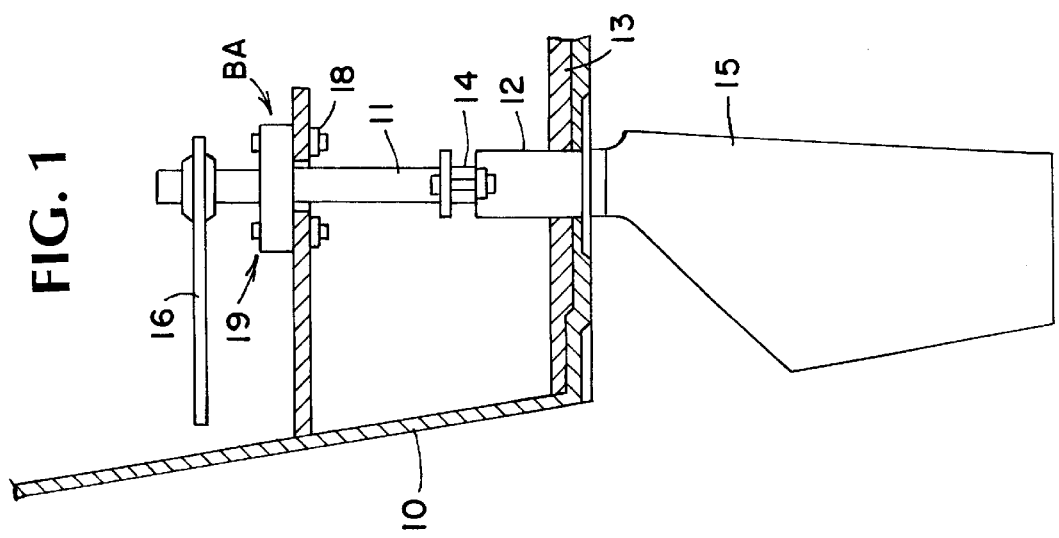

FIG. 5
FIG. 6
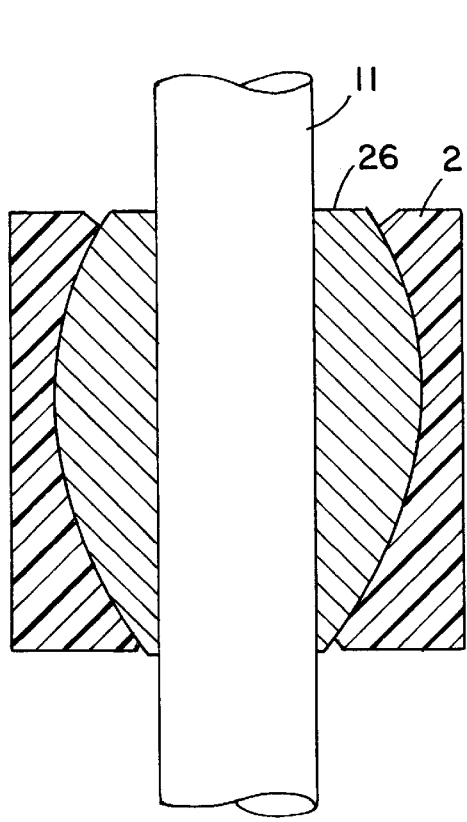
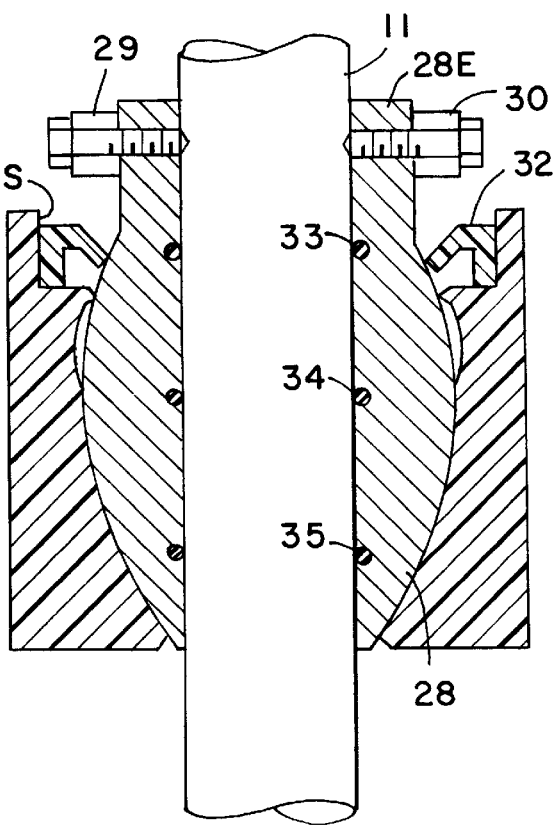
FIG. 7
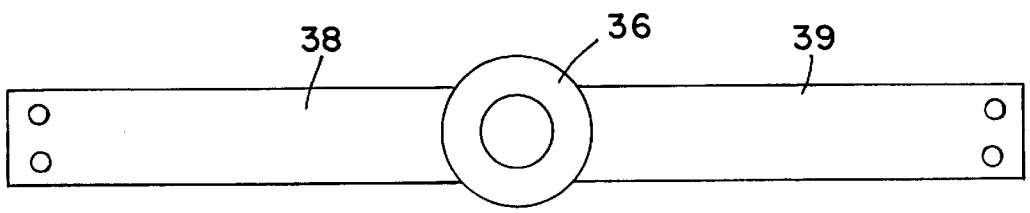
FIG. 8
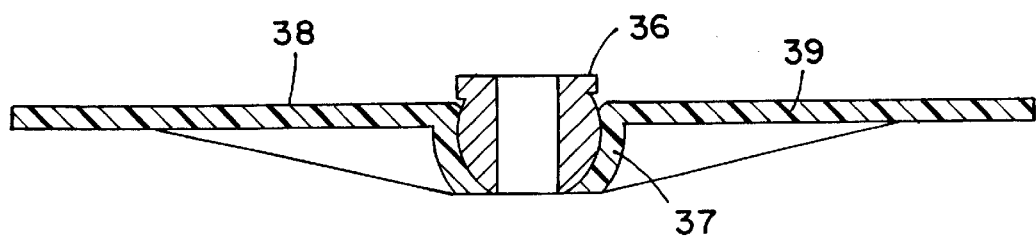

SELF-ALIGNING BALL AND SOCKET BEARING ASSEMBLY

BACKGROUND OF INVENTION

1. Field of Invention

This invention relates generally to bearing assemblies for supporting rotatable shafts or posts, and more particularly to a ball and socket bearing assembly adapted to align itself with a vertical rudder post extending therethrough regardless of the degree to which the post deviates from the vertical as a result of hydrodynamic or other forces imposed on the rudder.

2. Status of the Prior Art

A sailboat or a power boat is steered by a rudder in the form of a flat surfaced structure or blade hinged to the stern of the vessel and controlled by a helm. When the boat advances in a straight course, the rudder is then in line with the boat. But if the rudder is turned by the helm to one side or the other, it offers sufficient resistance to the water impinging on its surface to deflect the stern and thereby change the direction in which the boat advances.

In a typical sail or power boat installation, the rudder which is below the hull is joined to a rudder post which passes through a bronze or brass sleeve fastened to the hull, the post terminating in a lever or steering arm functioning as the helm. The metal sleeve is sealed by a packing gland affixed thereto to prevent water from entering the boat. To maintain the rudder post in its proper upright position, a bearing assembly is provided that is supported on a horizontal plate or platform cantilevered from the stern at a position below the steering arm, the rudder post passing through this assembly. The bearing assembly is adapted to sustain the side loads to which the post is subjected as well as to prevent the rudder post from slipping down into the water.

In operation, exerted on the rudder are hydrodynamic forces whose direction depend on the orientation of the rudder relative to the water stream impinging on its surface. These forces which are transmitted to the rudder post seek to laterally displace the post. The function of the bearing assembly through which the post passes is to resist these forces which are sometimes considerable, and thereby maintain the rudder post at its proper position.

A similar problem arises in propeller-driven vessels in which the rotating shaft turning the propeller may not be accurately aligned, and thereby requires a bearing assembly that will align itself with the shaft regardless of the degree to which its axis of rotation deviates from a nominal axis. Thus the Robbins U.S. Pat. No. 1,063,389, and the Schmitt U.S. Pat. No. 1,024,884 show self-aligning ball and socket bearing arrangements for motor boat propeller shafts which allow freedom of movement to the shaft in the absence of true shaft alignment.

Of greatest prior art interest is the Strong et al. U.S. Pat. No. 5,346,315. This patent discloses a ball and socket assembly adapted to engage the post of a rudder installed in the stern of a boat and to maintain it at a proper upright position regardless of the degree to which the post deviates from the vertical and is subjected to hydrodynamic forces which seek to displace the post.

The assembly consists of a journal box fixedly mounted on a support and having a spheroidal cavity, and a bearing through which the rudder post extends which is formed of UHHW polyethylene. The bearing includes a spheroidal or bulbous section that nests within the cavity of the box and a cylindrical section projecting from the box and pinned to the post whereby the bearing is in alignment with the post and its spheroidal section, is free to rotate within the cavity of the journal box in accordance with the rotation of the post as the boat is steered.

One practical drawback to a ball and socket assembly of the type disclosed in the prior Strong et al. patent is that it is relatively expensive to fabricate. The reason for this is that the journal box consists of two plastic plates formed of the same UHMW polyethylene material as the bearing, the plastic plates having contoured openings machined therein so that when put in superposed relation, they then define the spheroidal cavity in which the bearing is nested.

To put together the prior Strong et al. ball and socket bearing assembly, one must place the lower portion of the bulbous section of the UHMW bearing within the contoured opening of the lower plate, and then place the upper plate over the lower plate so that the upper portion of the bearing lies with the contoured opening of the upper plate. The superposed plastic plates are then riveted together to lock the bearing therein.

The manufacture of this assembly is time consuming and costly, requiring separate machining of the two plates forming the journal box, for the shape of the cavity in the journal box must properly match the shape of the bearing nested therein.

SUMMARY OF INVENTION

In view of the foregoing, the main object of this invention is to provide an improved self-aligning ball and socket bearing assembly adapted to receive a rudder post, a rotatable shaft, or any other rotatable element.

Among the significant advantages of an assembly in accordance with the invention are the following:

A. The socket for the ball-like bearing is defined by a cavity formed in a one-piece molded journal box which exactly conforms to the contours of the bearing nested in the cavity.

B. The journal box is formed of a fiberglass-reinforced resin that is molded about the bearing, thereby obviating the need for a bi-partite journal box that must be fitted about the bearing.

C. Because the journal box is molded about the bearing, it may be molded to assume whatever configuration is appropriate to the installation of the bearing assembly.

D. The assembly is relatively inexpensive to manufacture and lends itself to mass production, for the same mold may be used repeatedly.

Briefly stated, these objects are attained by a ball and socket bearing assembly adapted to receive the vertical post of a rudder installed in the stern of a boat. The assembly consists of a molded journal box having a spheroidal cavity therein defining a socket in which is nested a ball-like bearing formed of UHMW polyethylene or of a material having similar non-stick properties, the post passing through an axial bore in the bearing. The assembly is produced by placing the preformed bearing in a mold to create an annular space between the bearing and the inner wall of the mold. This space is then flooded with a curable liquid resin monomer whereby when the monomer is polymerized and rigidified, it does not bond to the non-stick bearing. The bearing is therefore free to rotate in the cavity and align itself with the rudder post regardless of the degree to which the post deviates from the vertical as a result of hydrodynamic or other forces imposed on the rudder.

BRIEF DESCRIPTION OF DRAWING

For a better understanding of the invention as well as other objects and further features thereof, reference is made to the following detailed description to be read in conjunction with the accompanying drawings, wherein:

FIG. 1 illustrates a rudder installed in the stern of a boat in which the rudder post passes through a ball and socket bearing assembly in accordance with the invention:

FIG. 2 illustrates the relationship of the rudder post and the bearing through which it passes when the axis of the post deviates from the vertical.

FIG. 3 is a separate view of the bearing component of the assembly;

FIG. 4 illustrates the mold in which the journal box component of the assembly is molded;

FIG. 5 is a longitudinal section taken through one preferred embodiment of an assembly in accordance with the invention;

FIG. 6 is a section taken through a second embodiment;

FIG. 7 is a top view of a third preferred embodiment of an assembly in accordance with the invention; and FIG. 8 is a side view of the third embodiment.

DESCRIPTION OF INVENTION

The Bearing Assembly

Referring now to FIGS. 1 and 2 there is shown the stern 10 of a boat having installed therein a rudder post 11 whose lower end passes through a brass or bronze sleeve 12 fastened to the hull 13 of the boat, post 11 being joined to a rudder 15 disposed below the hull. Attached to metal sleeve 12 is a packing gland 14 which prevents water from leaking into the boat.

Coupled to the upper end of the upright rudder post 11 is a steering arm or lever 16 which makes it possible for a pilot to steer the boat. Rudder post 11 passes through an opening in a horizontal plate or platform 17 that is below the steering arm and is cantilevered from stern 10. The platform is made of wood, fiberglass-reinforced plastic or other high strength material. Mounted on platform 17 by bolts 18 is a ball and socket bearing assembly BA in accordance with the invention through which the rudder post 11 extends. Thus the rudder post is maintained in its upright position by sleeve 12 engaging the lower end of the post and by the bearing assembly BA adjacent its upper end.

As shown separately in FIG. 2, the ball and socket assembly BA includes a molded plastic journal box 19 provided with bore holes H to receive the mounting bolts 18.

Journal box 19 has a cavity C therein with which is nested a ball-like bearing 21. Bearing 21, as shown separately in FIG. 3, is molded, machined or otherwise formed of a synthetic plastic material having a very low-coefficient of sliding friction. The preferred material is UHMW, an ultra-high molecular weight polyethylene whose coefficient of friction is almost as low as that of TEFLON (tetrafluoroethylene). UHMW possesses non-stick properties, such that when the journal box is molded about the bearing with a curable resin when the resin polymerizes and becomes rigid, a cavity is then created in the journal box that conforms to the shape of the bearing but not bonded to the bearing. Hence the low-friction bearing is then rotatable within the cavity.

Bearing 21 illustrated in FIG. 3 is in the form of a sphere having truncated poles $P_1$ and $P_2$, and an axial bore 22 extending between the poles having a diameter substantially matching the diameter of the rudder post 11 received within the bore.

But because the cylindrical bank of bore 22 is formed of low friction bearing material, the rudder post is free to rotate within the bore. In practice, however, the rudder post is pinned to the bearing so that when the post is rotated, bearing 21 pinned thereto rotates within the cavity of the journal box 19. But when the bearing assembly is used to support a rotating shaft, the shaft is not pinned to the bearing but rotates within the bearing.

In an assembly in accordance with the invention, the bearing 21 whose angular orientation with respect to the cavity C of the journal box 19 is adjustable, aligns itself with rudder post 11, regardless of the degree to which the post deviates from the vertical axis X. Thus, as shown in FIG. 2, the axis Y of rudder post 11 is inclined with respect to vertical axis, X, bearing 21 being aligned with the rudder post.

The danger exists that steering arm 16 coupled to rudder post 11 may become loose, as a consequence of which the rudder post which passes through bearing assembly BA, and sleeve 12 may then be free to slip down into the water, with a resultant loss of the rudder. To prevent the rudder post 11 from slipping down, a collar (not shown) is attached by set screws to rudder post 11. This collar prevents axial displacement of the post in the downward direction without, however, interfering with rotation of the post.

As pointed out in the background section, rudder 15 is subjected to hydrodynamic forces which are transferred to rudder post 11. When these forces are considerable, they seek to laterally displace the rudder post from its proper position. Because the post is pinned to bearing 21, these forces are transmitted to bearing 21 which is nested within the cavity C of the journal box 19 affixed to platform 17. The journal box therefore acts to absorb these forces to prevent tilting or displacement of rudder post 11.

Molding Technique

The manner in which journal box 19 is molded about the ball-like bearing 21 will now be described in connection with FIG. 4.

Use is made of a cylindrical mold 23 for forming a cylindrical fiberglass-reinforced resin journal box of high strength having a cavity therein which exactly conforms to the configuration of the bearing nested therein. The resin may be a polyester, a vinyl ester or an epoxy. The resin is reinforced by fibers such as fiberglass, graphite fibers or Kelvar to provide a journal box of high structural strength resistant to whatever forces the installed assembly is subjected.

Preformed bearing 21 is placed in the center of mold 23 whose diameter is greater than that of the ball-like bearing to provide an annular space 24 between the inner wall of the mold and the surface of the bearing. The inner wall of the mold is lined with fiberglass matting and fiberglass roving 25 is also placed within the annular space. Annular space 24 is then flooded with an uncured liquid monomer of the resin, using for this purpose vaccum-assisted resin injection. The mold is then closed.

When the resin in the closed mold is fully polymerized and forms a solid body, then within the mold is a ball and socket bearing assembly in accordance with the invention in which the ball-like preformed bearing is socketed in the cavity formed in the journal box. And while the bank of the cavity conforms exactly to the contours of the bearing, it is not bonded thereto, for the bearing is fabricated of non-stick UHMW polymeric material.

Mold 23 is preferably formed of non-stick plastic material, such as UHMW polyethylene, hence the journal box molded therein is not bonded to the inner surface of the mold. And because UHMW material has a high thermal coefficient of expansion, by heating and expanding the mold, it then separates from the assembly and it becomes possible to remove the bearing assembly from the mold without difficulty.

After the bearing assembly is removed from the heated mold, the UHMW mold then cools and reverts to its original machined dimensions, and the mold is now in condition for reuse. Thus no need exists for a two part mold or for a tapered mold. In practice, however, other mold materials may be used, such as aluminum. And with a UHMW mold there is no need for a release agent. The molded journal box is finished inside and out, and no flashing need be removed.

When the UHMW mold is heated to expand it, this heat also acts to expand the preformed UHMW bearing and therefore presses the bearing against the bank of the cavity in the fiberglass-reinforced resin journal box. But when the bearing cools, it returns to its original machined dimensions and it is then free to rotate within the cavity.

Preferred Embodiments

FIG. 5 illustrates one preferred embodiment of a self-aligning ball and socket bearing assembly in accordance with the invention in which the bearing 26 formed of UHMW polyethylene or similar non-stick material has a somewhat elliptical form whose poles are truncated, the upper pole having a greater degree of truncation than the lower pole.

The longitudinal bore in bearing 26 which extends axially between the upper and lower poles has a diameter substantially matching that of the diameter of the rudder post 11 (or shaft) received in the bore.

Bearing 26 is nested in the conforming cavity of a fiberglass-reinforced molded plastic journal box 27. Bearing 26 is rotatable in this cavity so that should the post become displaced from the vertical axis, the bearing will align itself with the post. This assembly is produced by the method described in connection with FIG. 4.

In the embodiment of the ball and socket bearing assembly shown in FIG. 6, the bearing 28 is similar in configuration to that shown in FIG. 5 except that bearing 28 is provided at its upper end with a cylindrical extension 28E which encircles post 11 above the top end of the journal box. Extension 28E is pinned to rudder post 11 by diametrically-opposed set screws 29 and 30 which are turned in to engage the surface of the post.

Thus with this assembly, rudder post 11 is not free to rotate with respect to bearing 28, and when the post rotates, then the bearing pinned thereto rotates within the cavity of the journal box 31. Because bearing 28 is formed of a material having a very low coefficient of sliding friction, it is effectively self-lubricating. UHMW polyethylene, like TEFLON functions as a solid lubricant.

To prevent water from leaking through the assembly in the space between the bearing and the journal box, a lip seal 32 formed of resilient material such as Nitrile rubber is seated on a shoulder 31S formed in the upper end of journal box 32, the lip engaging the surface of the bearing. And O-rings 33 to 35 encircling post 11 at spaced positions in the bore of the bearing prevent water leakage along the post, so that the assembly is fully sealed.

The journal box need not be cylindrical in shape but may be molded to assume a configuration that is appropriate to the installation. Thus in FIGS. 7 and 8, the ball-like bearing 36 is similar to that in FIG. 6, but in this embodiment of the assembly, bearing 36 is nested in a molded fiberglass-reinforced resin journal box 37 having a pair of opposing stringers 38 and 39. These stringers make it possible to suspend the assembly between a pair of parallel platforms or shelves.

Thus in a self-aligning ball and socket bearing assembly in accordance with the invention, the bearing need not have a strictly spherical form, nor does the molded journal box have to have a cylindrical form, for the journal box may be molded to assume other shapes. But regardless of the configuration assumed by the assembly, it must have a bearing formed of non-stick, low-coefficient of friction material having a bulbous section which is rotatable within a conforming cavity in the journal box molded about the bearing.

While there have been shown preferred embodiments of the self-aligning ball and socket bearing assembly in accordance with the invention, it will be appreciated that many changes may be made therein without departing from the spirit of the invention.

We claim:

1. A self-aligning ball and socket bearing assembly adapted to receive a rotatable shaft or post extending along a nominal axis; said assembly comprising:

A. a preformed bearing provided with a bulbous section and a bore extending axially therethrough having a diameter substantially matching that of the post, said bearing being fabricated of a low-coefficient of friction synthetic plastic ultra-high molecular weight material possessing non-stick properties; and B. a single-piece journal box attachable to a platform to maintain the box at a fixed position molded of resin about the bulbous section of the bearing to define a cavity conforming to the section but not bonded thereto because of its non-stick properties, whereby the bearing is nested in the journal box and is rotatable therein to align the bearing with the post regardless of the degree to which the post deviates from the nominal axis.

2. An assembly as set forth in claim 1, in which the bearing is formed of tetrafluoroethylene.

3. An assembly as set forth in claim 1, in which the bearing has the shape of a sphere whose upper and lower poles are truncated, said bore extending between the poles.

4. An assembly as set forth in claim 3, in which the bearing has a cylindrical extension above said upper pole encircling the post, and means to pin the extension to said post whereby rotation of the post causes the bearing to rotate within the cavity.

5. An assembly as set forth in claim 4, in which said means includes a set screw that is turnable into said extension to engage the post.

6. An assembly as set forth in claim 1, in which the journal box is molded of a fiberglass-reinforced resin.

7. An assembly as set forth in claim 6, in which the molded journal box is provided with an opposing pair of stringers for mounting the assembly between a pair of parallel platforms.

* * * * *

UNITED STATES PATENT AND TRADEMARK OFFICE
CERTIFICATE OF CORRECTION

PATENT NO. : 6,149,337
DATED : Nov. 21, 2000
INVENTOR(S) : John R. Newton, et al It is certified that error appears in the above-identified patent and that said Letters Patent is hereby corrected as shown below:

On cover page, item [75], the name of the second inventor is spelled incorrectly as Jeffre W. Strong. The correct spelling is Jeffrey W. Strong.

Signed and Sealed this

Twenty-ninth Day of May, 2001

Attest:

NICHOLAS P. GODICI

Attesting Officer

Acting Director of the United States Patent and Trademark Office